US011625827B2

(12) United States Patent
Schafer (10) Patent No.: US 11,625,827 B2
(45) Date of Patent: *Apr. 11, 2023

(54) VISUAL AUGMENTATION OF REGIONS WITHIN IMAGES

(71) Applicant: Analogic Corporation, Peabody, MA (US)

(72) Inventor: David Schafer, Rowley, MA (US)

(73) Assignee: Analogic Corporation, Peabody, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,366

(22) Filed: Nov. 9, 2020

(65) Prior Publication Data

US 2021/0056694 A1 Feb. 25, 2021

Related U.S. Application Data

(63) Continuation of application No. 15/890,435, filed on Feb. 7, 2018, now Pat. No. 10,872,409.

(51) Int. Cl.
*G06K 9/00* (2022.01)
*G06T 7/00* (2017.01)
(Continued)

(52) U.S. Cl.
CPC .............. *G06T 7/0012* (2013.01); *G06T 7/11* (2017.01); *G06T 7/155* (2017.01);
(Continued)

(58) Field of Classification Search
CPC ......... G06T 7/0012; G06T 7/11; G06T 7/155; G06T 2200/04; G06T 2207/10076; G06T 2207/10081
(Continued)

(56) References Cited

U.S. PATENT DOCUMENTS 6,317,509 B1 * 11/2001 Simanovsky .......... G01V 5/005
250/363.04
8,107,726 B2 * 1/2012 Xu ....................... G06K 9/6256
382/173

(Continued)

OTHER PUBLICATIONS

Zaila, Yisleidy Linares, Marta L. Baguer Díaz-Romañach, and Manuel González-Hidalgo. "A Graph Based Segmentation Strategy for Baggage Scanner Images." International Conference on Articulated Motion and Deformable Objects. Springer, Cham, 2014. (Year: 2014).*

(Continued)

*Primary Examiner* — Jonathan S Lee
(74) *Attorney, Agent, or Firm* — TraskBritt (57) ABSTRACT

Among other things, one or more systems and/or techniques for visually augmenting regions within images are provided herein. An image of an object, such as a bag, is segmented to identify an item (e.g., a metal gun barrel). Features of the item are extracted from voxels representing the item within the image (e.g., voxels within a first region), such as a size, shape, density, and orientation of the item. Response to the features of the item matching predefined features of a target item to detect, one or more additional regions are identified, such as a second region proximate to the first region based upon a location of the second region corresponding to where a connected part of the item (e.g., a plastic handle of the gun) is predicted to be located. The one or more regions are visually distinguished within the image from other regions (e.g., colored, highlighted, etc.).

16 Claims, 9 Drawing Sheets

(51) Int. Cl.
*G06T 7/155* (2017.01)
*G06T 7/11* (2017.01)
(52) U.S. Cl.
CPC ...... *G06T 2200/04* (2013.01); *G06T 2207/10076* (2013.01); *G06T 2207/10081* (2013.01)
(58) Field of Classification Search
USPC .................................................. 382/131
See application file for complete search history.

(56) References Cited

U.S. PATENT DOCUMENTS

| | | | | |
|---|---|---|---|---|
| 10,042,079 | B2* | 8/2018 | Patnaik | G06T 7/11 |
| 2005/0113680 | A1* | 5/2005 | Ikeda | A61B 6/504 |
| | | | | 600/425 |
| 2005/0248450 | A1* | 11/2005 | Zanovitch | G08B 25/14 |
| | | | | 340/506 |
| 2013/0251098 | A1* | 9/2013 | Morton | G01N 23/046 |
| | | | | 378/10 |
| 2016/0247278 | A1* | 8/2016 | Ouji | G06K 9/4642 |
| 2017/0242148 | A1* | 8/2017 | Yu | G06K 9/6211 |

OTHER PUBLICATIONS

Flitton, Greg, Toby P. Breckon, and Najla Megherbi. "A comparison of 3D interest point descriptors with application to airport baggage object detection in complex CT imagery." Pattern Recognition 46.9 (2013): 2420-2436. (Year: 2013).*

Al-Najdawi, Nijad. "A concealed ammo detection system for passengers luggage screening." 2014 International Conference on Multimedia Computing and Systems (ICMCS). IEEE, 2014. (Year: 2014).*

Mery, Domingo, and Vladimir Riffo. "Automated object recognition in baggage screening using multiple X-ray views." 52nd Annual Conference of the British Institute for Non-Destructive Testing, Telford. 2013. (Year: 2013).*

Cui, Yunqi, and Basak Oztan. "Automated firearms detection in cargo x-ray images using RetinaNet." Anomaly detection and imaging with X-Rays (ADIX) IV. vol. 10999. SPIE, 2019. (Year: 2019).*

Flitton, Greg, Andre Mouton, and Toby P. Breckon. "Object classification in 3D baggage security computed tomography imagery using visual codebooks." Pattern Recognition 48.8 (2015): 2489-2499. (Year: 2015).*

Mery, Domingo, et al. "Automated X-ray object recognition using an efficient search algorithm in multiple views." Proceedings of the IEEE conference on computer vision and pattern recognition workshops. 2013. (Year: 2013).*

Nercessian, Shahan, Karen Panetta, and Sos Agaian. "Automatic detection of potential threat objects in X-ray luggage scan images." 2008 IEEE conference on technologies for homeland security. IEEE, 2008. (Year: 2008).*

* cited by examiner

VISUAL AUGMENTATION OF REGIONS WITHIN IMAGES

CROSS-REFERENCE TO RELATED APPLICATION

This application is a continuation of U.S. patent application Ser. No. 15/890,435, filed Feb. 7, 2018, now U.S. Pat. No. 10,872,409, issued Dec. 22, 2020, the disclosure of which is hereby incorporated herein in its entirety by this reference.

TECHNICAL FIELD

The present application relates to the field of computed tomography (CT). It finds particular application with security systems configured to image an object and to identify items of interest, such as potential threat items, within the object. It also relates to medical, industrial, and/or other applications where identifying items within an object under examination would be useful.

BACKGROUND

Security at airports and in other travel related areas is an important issue. One technique used to promote travel safety is baggage inspection. Often, a radiation imaging modality is utilized to facilitate baggage screening. For example, a CT system may be used to provide security personnel with two and/or three dimensional views of objects. After viewing images provided by an imaging apparatus, security personnel may make a decision as to whether the baggage is safe to pass through a security checkpoint or if further (hands-on) inspection is warranted.

To reduce human error associated with identifying potential threat items inside the baggage, automated object recognition systems may be utilized. Such systems can extract an item from an image of an object, such as a shaving cream container within a bag, and compute features of the item based upon properties/elements of the image. The computed features of the item can then be used for discriminating the item by comparing the item's features (e.g., density, effective atomic number, shape, etc.) with predefined features of items, such as threat items or any other item of interest.

Unfortunately, some items of interest may be comprised of parts having different features, and thus may not be correctly identified by either the automated object recognition or by the human screener reviewing the image. For example, a gun can comprise a metal barrel and a plastic gun handle. The metal barrel comprises a metal material having a high density, while the plastic gun handle comprises a plastic material having a lower density. The higher density metal barrel may be visible in the image. However, the lower density plastic handle may not be visible or recognizable as being connected to the metal barrel and thus part of the gun. Due to the low density of the handle, for example, a human user may not readily detect the outline of a gun and may, instead, believe that the metal barrel is a benign object or part of the bag, for example. Moreover, while automated object recognition systems are generally able to detect items such as guns, one could imagine that in certain circumstances, a gun may not be detected due to the disparity between the density of the gun barrel and the gun handle (e.g., segmentation algorithms may segment the gun barrel from the gun handle and may not recognize that the two objects are, in fact, part of a single item and should be rejoined as a single item). Moreover, even if the gun barrel is identified as a potential threat object by an automatic detection algorithm, the screening process may usually include visual inspection of the image to determine the presence of a real threat, which would not appear to be a gun, but only a metal bar without a handle and trigger.

BRIEF SUMMARY

Aspects of the present application address the above matters, and others. According to one aspect a method for augmenting a region within an image is provided. The method comprises segmenting the image of the object to identify an item depicted within a first region of the image. The method also comprises extracting features of the item from the image. The method also comprises comparing the features of the item to predefined features of a target item to be detected. The method also comprises identifying a second region proximate to the first region comprising the item in response to determining that the features of the item match the predefined features within a threshold amount. The method also comprises identifying the second region based upon a location of the second region corresponding to where a connected part of the item is predicted to be located. The method also comprises applying a visual augmentation to the second region to visually distinguish the second region from other regions depicted within the image to create an augmented image. The method also comprises rendering the augmented image through a display.

According to another aspect, a computer tomography system, comprising a radiation source, a detector array, an image reconstructor, and an item detection component, is provided. The image reconstructor is configured to generate a three-dimensional image of an object. The item detection component is configured to identify an item within a first region of the three-dimensional image as a potential item of interest by comparing features of items depicted within the three-dimensional image to predefined features of an item of interest to be detected. The item detection component is configured to identify a second region proximate to the first region comprising the item in response to determining that the features of the item match the predefined features within a threshold amount. The item detection component is configured to identify the second region based upon a location of the second region corresponding to where a connected part of the item is predicted to be located. The item detection component is configured to apply a visual augmentation to the second region to visually distinguish the second region from other regions depicted within the image to create an augmented image. The item detection component is configured to render the augmented image through a display.

According to another aspect, a non-transitory computer-readable medium, comprising computer-executable instructions that when executed via a processing unit cause performance of operations, is provided. The operations comprise identifying a first item depicted within a first region of an image of an object based upon the first item having a density above a threshold value. The operations also comprise determining that the first item has a probability greater than a threshold of being part of a target item to be detected. The operations also comprise selecting a second region proximate to the first region, the second region selected as a function of an orientation of the first item. The operations also comprise evaluating the second region to determine whether a second item is present within the second region and upon determining that the second item is present within the second region, grouping voxels of the first item with voxels of the second item such that the first item and the second item are treated as a single item.

Those of ordinary skill in the art may appreciate still other aspects of the present application upon reading and understanding the appended description.

BRIEF DESCRIPTION OF THE DRAWINGS

The application is illustrated by way of example and not limitation in the figures of the accompanying drawings, in which like references generally indicate similar elements and in which.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Among other things, one or more systems and/or techniques for identifying potential items of interest and/or visually augmenting a region of an image are provided for herein. An object, such a bag, may comprise various items, such as shoes, a laptop, a book, etc. The bag may be used to conceal an item of interest, such as a gun or knife. In order to evaluate the bag for identifying items of interest, the bag may be scanned to create a three-dimensional image of the bag. The three-dimensional image comprises a plurality of voxels that are each associated with a CT value or relatively homogenous range of CT values (e.g., where the CT value is indicative of a density value of the aspect of the object represented by the voxel). The three-dimensional image is "colored" or "shaded" by assigning colors or shades of grey to voxels based upon the CT values of such voxels (e.g., voxels with CT values within a first threshold range of CT values are colored orange, voxels with CT values within a second threshold range of CT values are colored blue or green, etc.).

When an image is presented to a user for inspection, the user is trained to identify potential items of interest (e.g., threat items) within the object of the interest. For example, security personnel may inspect the image for outlines of prohibited items. Non-prohibited or benign objects clutter the CT image and make it more difficult to identify the target threat object. Also, due only to the disparity in CT values (and thus colors/shading) between some aspects of a same item, it may be difficult at times to detect the true outline of the object and therefore detect the prohibited item. For example, a gun may be comprised of a metal barrel and a plastic handle, which are colored/shaded very differently in the image due to their disparity in densities and therefore CT values. In one example, merely a metal barrel of a gun is readily identifiable due to a relatively high density of metal, while a plastic handle and trigger are not identifiable as part of the gun due to a relatively low density of plastic. Thus, an operator looking at the three-dimensional image of the bag may be unable to determine that the cylindrical metal barrel is actually part of a gun due to being unable to visually identify the plastic handle and trigger within the three-dimensional image. Moreover, during image segmentation the metal barrel and plastic handle may be identified as two distinct items. It may be appreciated that if voxels associated with these two distinct items (e.g., voxels associated with the metal barrel and voxels associated with the plastic handle) are not regrouped (e.g., and treated as a single item), an operator or an automated threat detection system may have difficulties identifying the items as being part of a threat item. It may be appreciated that to ensure detection by an automated threat detection system, the threshold for issuing an alert may be low to ensure that threat items are detected. However, this low threshold may result in false alarms.

Accordingly, as provided herein, the identification of items composed of multiple different types of materials is improved so that parts of items can be visually distinguished and identifiable within images and/or so that voxels that are initially segmented as separate items are regrouped to be associated with a single item. In particular, features of an item depicted within a first region of an image are extracted and compared to predefined features of a target item that is to be detected (e.g., morphological characteristics such as size, shape, density, z-effective, etc., of the item may match predefined morphological characteristics of a gun barrel). A second region proximate to the first region (e.g., separated by less than a specified number of voxels from the first region) is identified based upon the second region corresponding to a location or area where a connected part of the item (e.g., a plastic gun handle) is predicted to be located (e.g., a size, shape, and orientation of the gun barrel may be used to predict where a plastic gun handle would be located in relation to the gun barrel). In some embodiments, a visual augmentation is then applied to the second region and/or the connected part therein to visually distinguish the second region and/or the connected part from other regions of the image. For example, the second region may be highlighted, colored, edge enhanced, have density values within defined regions (e.g., the second region or portions thereof) enhanced, etc. This allows an operator (e.g., security personal at an airport that are scanning and evaluating luggage for threat items) to more easily identify items of interest that are composed of multiple materials, such as lower and high density materials. Moreover, in some embodiments, a first set voxels of a first item (e.g., the gun barrel) may be grouped with a second set of voxels of a second item (e.g., a handle) that were separately identified during image segmentation such that the two sets of voxels are associated with a single item (e.g., a gun).

Figure 1:
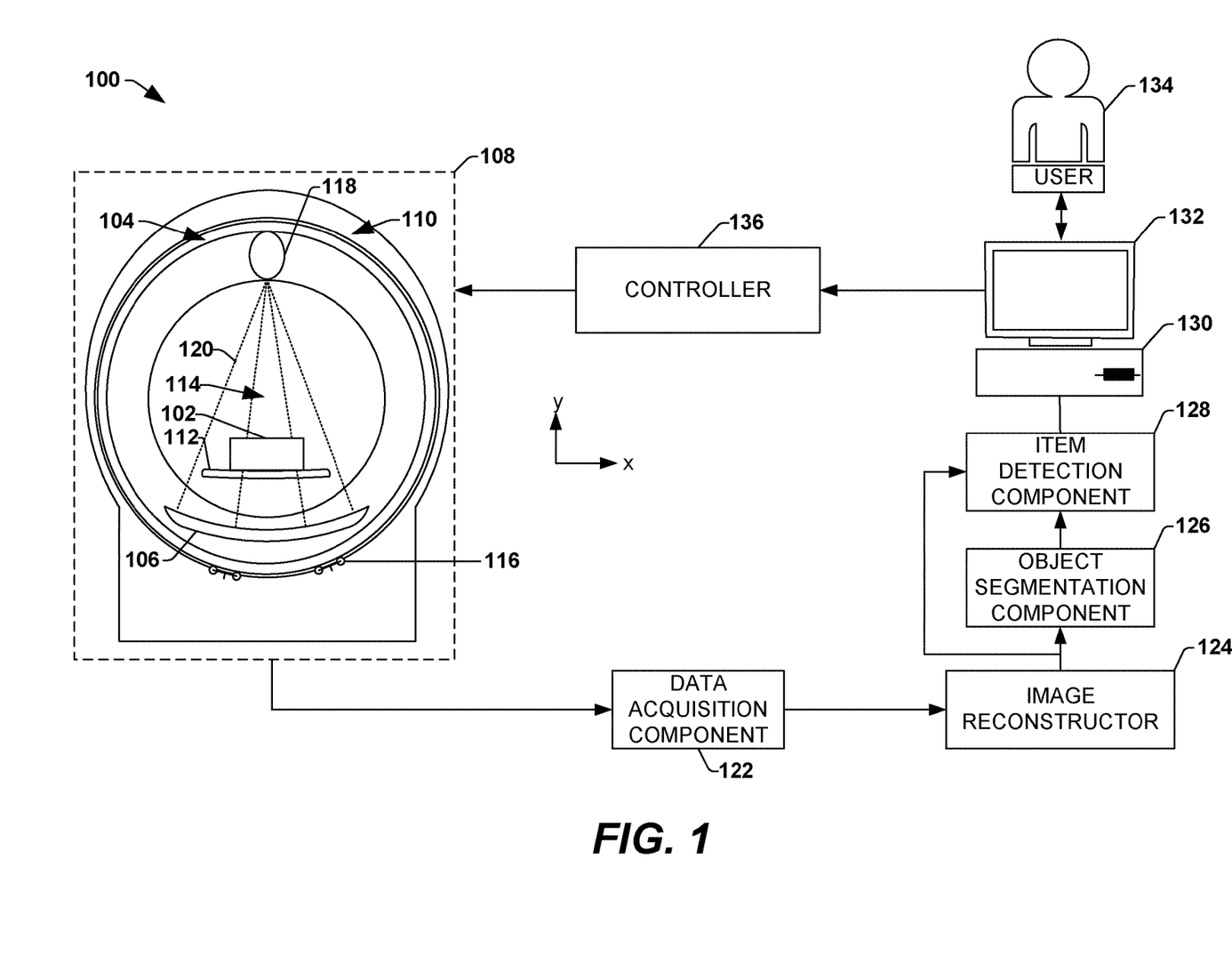
FIG. 1 illustrates an example environment of an imaging modality.

FIG. 1 is an illustration of an example environment 100 comprising a computed tomography (CT) system that may be configured to generate images representative of an object 102 (e.g., baggage, patient, etc.) or aspect(s) thereof under examination and detect certain types of items concealed within the object 102 using the generated image(s). Such an example system may be employed for identifying potential threat containing items (e.g., an item composed of different materials, such as a gun composed of a dense metal barrel and a less dense plastic handle), from a class of items, inside baggage that has been subjected to imaging, for example.

It may be appreciated that while the example environment 100 describes a CT system configured to generate two-dimensional and/or three-dimensional images of the object 102 under examination, other radiation imaging modalities are also contemplated for generating images from which items within the object 102 may be segmented for detection and classification. Moreover, the arrangement of components and/or the types of components included in the example environment 100 are merely provided as an example arrangement. By way of example, in some embodiments, a data acquisition component 122 is comprised within a detector array 106.

In the example environment 100, an examination apparatus 108 of the CT system is configured to examine one or more objects such as the object 102. The examination apparatus 108 can comprise a rotating gantry 104 and a (stationary) support structure 110 (e.g., which may encase and/or surround at least a portion of the rotating gantry 104 (e.g., as illustrated with an outer, stationary ring, surrounding an outside edge of an inner, rotating ring)). During an examination of the object 102, the object 102 can be placed on a support article 112, such as a bed or conveyor belt, for example, that is selectively positioned in an examination region 114 (e.g., a hollow bore in the rotating gantry 104), and the rotating gantry 104 can be rotated and/or supported about the object 102 by a rotator 116, such as a motor, drive shaft, chain, roller truck, etc.

The rotating gantry 104 may surround a portion of the examination region 114 and may comprise one or more radiation sources 118 (e.g., an ionizing x-ray source, gamma radiation source, etc.) and a detector array 106 that is mounted on a substantially diametrically opposite side of the rotating gantry 104 relative to the radiation source(s) 118.

During an examination of the object 102, the radiation source(s) 118 emits fan, cone, wedge, and/or other shaped radiation 120 configurations from a focal spot(s) of the radiation source(s) 118 (e.g., a region within the radiation source(s) 118 from which radiation 120 emanates) into the examination region 114. It may be appreciated that such radiation 120 may be emitted substantially continuously and/or may be emitted intermittently (e.g., a brief pulse of radiation is emitted followed by a resting period during which the radiation source(s) 118 is not activated).

As the emitted radiation 120 traverses the object 102, the radiation 120 may be attenuated differently by different aspects of the object 102. Because different aspects attenuate different percentages of the radiation 120, an image(s) may be generated based upon the attenuation, or variations in the number of photons that are detected by the detector array 106. For example, more dense aspects of the object 102, such as a bone, a metal plate, electronic components, etc., may attenuate more of the radiation 120 (e.g., causing fewer photons to strike the detector array 106) than less dense aspects, such as skin or clothing.

The detector array 106 is configured to directly convert (e.g., using amorphous selenium and/or other direct conversion materials) and/or indirectly convert (e.g., using photo-detectors and/or other indirect conversion materials) detected radiation into signals that can be transmitted from the detector array 106 to the data acquisition component 122 configured to compile signals that were transmitted within a predetermined time interval, or measurement interval, using various techniques (e.g., integration, photon counting, etc.). It may be appreciated that such a measurement interval may be referred to as a "view" and generally reflects signals generated from radiation 120 that was emitted while the radiation source(s) 118 was at a particular angular range relative to the object 102. Based upon the compiled signals, the data acquisition component 122 can generate projection data indicative of the compiled signals, for example.

The example environment 100 further comprises an image reconstructor 124 configured to receive the projection data that is output by the data acquisition component 122. The image reconstructor 124 is configured to generate three-dimensional image data (also referred to as three-dimensional image(s)) of the object 102 from the projection data using a suitable analytical, iterative, and/or other reconstruction technique (e.g., back projection reconstruction, tomosynthesis reconstruction, iterative reconstruction, etc.). In this way, the data is converted from projection space to image space, a domain that may be more understandable by a user 134 viewing the image(s), for example.

In the example environment 100, an object segmentation component 126 may be configured to receive the image data and to segment items represented in the image data. By way of example, an image of a suitcase may depict clothes, a hair dryer, grooming products, a laptop, and/or other items within the suitcase, and the object segmentation component 126 may segment voxels of the image data into its component parts (e.g., separating voxels of the image data representative of the laptop from voxels of the image data representative of the hair dryer). In this way, representations of items within the suitcase may be isolated and analyzed individually. It may be appreciated that while reference is made herein to a single object segmentation component 126, there may be multiple object segmentation components 126 and/or the object segmentation component 126 may be configured to perform segmentation of multiple, distinct classes of items. For example, there may be multiple segmenters running in parallel or series. One segmenter may focus on metallic objects and another on plastic objects. As will be further described below, when segmentation components are run in series the output of one segmenter (e.g., a segmenter focusing on metallic objects such as gun barrels) may influence the operation of a second segmenter (e.g., a segmenter focusing on gun handles) by specifying a range of CT values that the second segmenter is to focus upon, by specifying a region(s) of a three-dimensional image where the second segmenter is to focus (e.g., limits the search of the second segmenter), etc.

In the example environment 100, an item detection component 128 can receive the image data from the image reconstructor 124 and/or the image data, containing the segmented object(s), from the object segmentation component 126. As will be described in more detail below, the item detection component 128 can be configured to identify a first region comprising an item of interest, and then identify a second region proximate to the first region as potentially comprising a connected part of the item (e.g., a plastic handle connected to a metal gun barrel). The item detection component 128 is configured to trigger additional visual augmentation of the second region to visually distinguish the second region from other regions within the image.

The example environment 100 further comprises a terminal 130, or workstation (e.g., a computer), that may be configured to receive the image data (e.g., output by the object segmentation component 126 and/or the image reconstructor 124) and/or the information output by the item detection component 128 (e.g., an augmented image). The terminal 130 may also be configured to present the image data and/or information for display on a monitor 132 to the user 134 (e.g., security personnel, medical personnel, etc.). In this way, the user 134 can inspect the image(s) to identify areas of interest within the object 102 and/or receive alerts with a threat item is detected. The terminal 130 can also be configured to receive user input, which can direct operations of the examination apparatus 108 (e.g., a speed of a conveyor belt), for example. The user input can also include annotations describing the result of the inspection.

In the example environment 100, a controller 136 is operably coupled to the terminal 130. In one example, the controller 136 is configured to receive input from the terminal 130, such as user input for example, and to generate instructions for the examination apparatus 108 indicative of operations to be performed. For example, the user 134 may desire to reexamine the object 102, and the controller 136 may issue a command instructing the support article 112 to reverse direction (e.g., bringing the object 102 back into an examination region 114 of the examination apparatus 108).

It may be appreciated that the example component diagram is merely intended to illustrate one embodiment of one type of imaging modality and is not intended to be interpreted in a limiting manner. For example, the functions of one or more components described herein may be separated into a plurality of components and/or the functions of two or more components described herein may be consolidated into merely a single component. Moreover, the imaging modality may comprise additional components configured to perform additional features, functions, etc. and/or some components described herein may be optional.

Figure 2A:
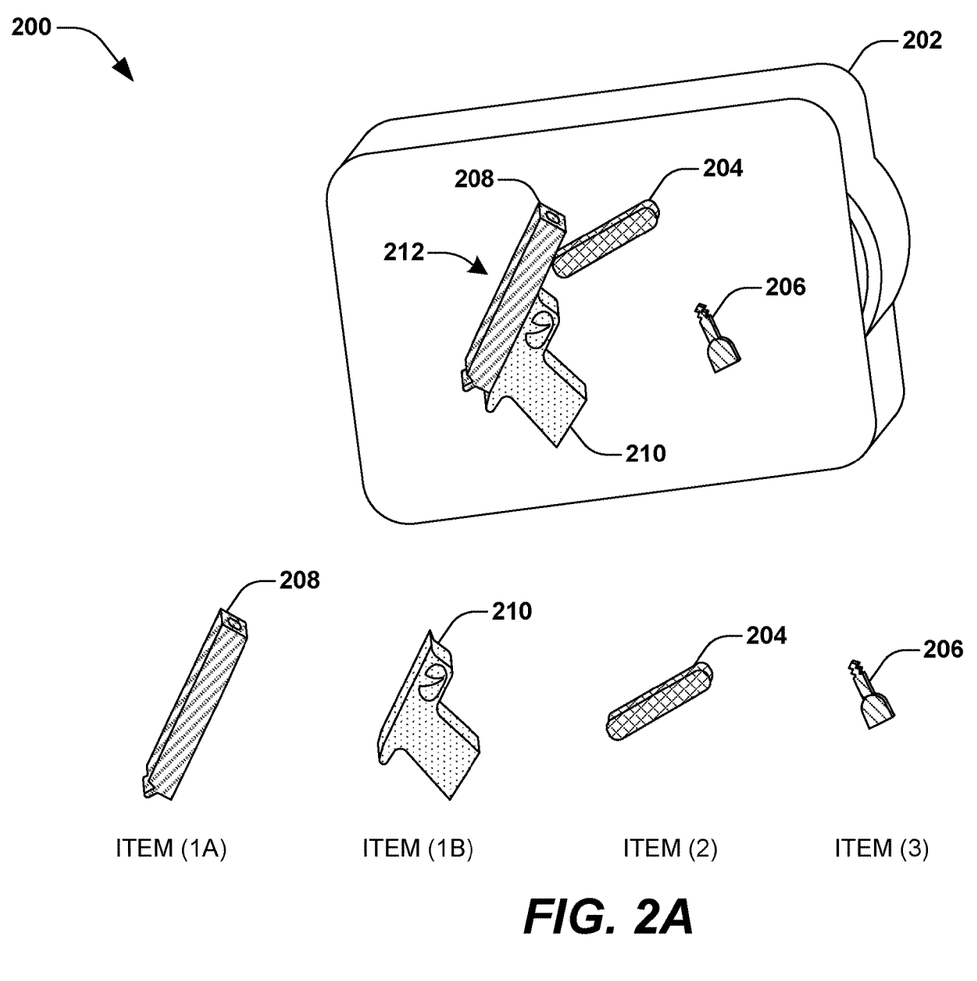
FIG. 2A illustrates an example of an object.
Figure 2B:
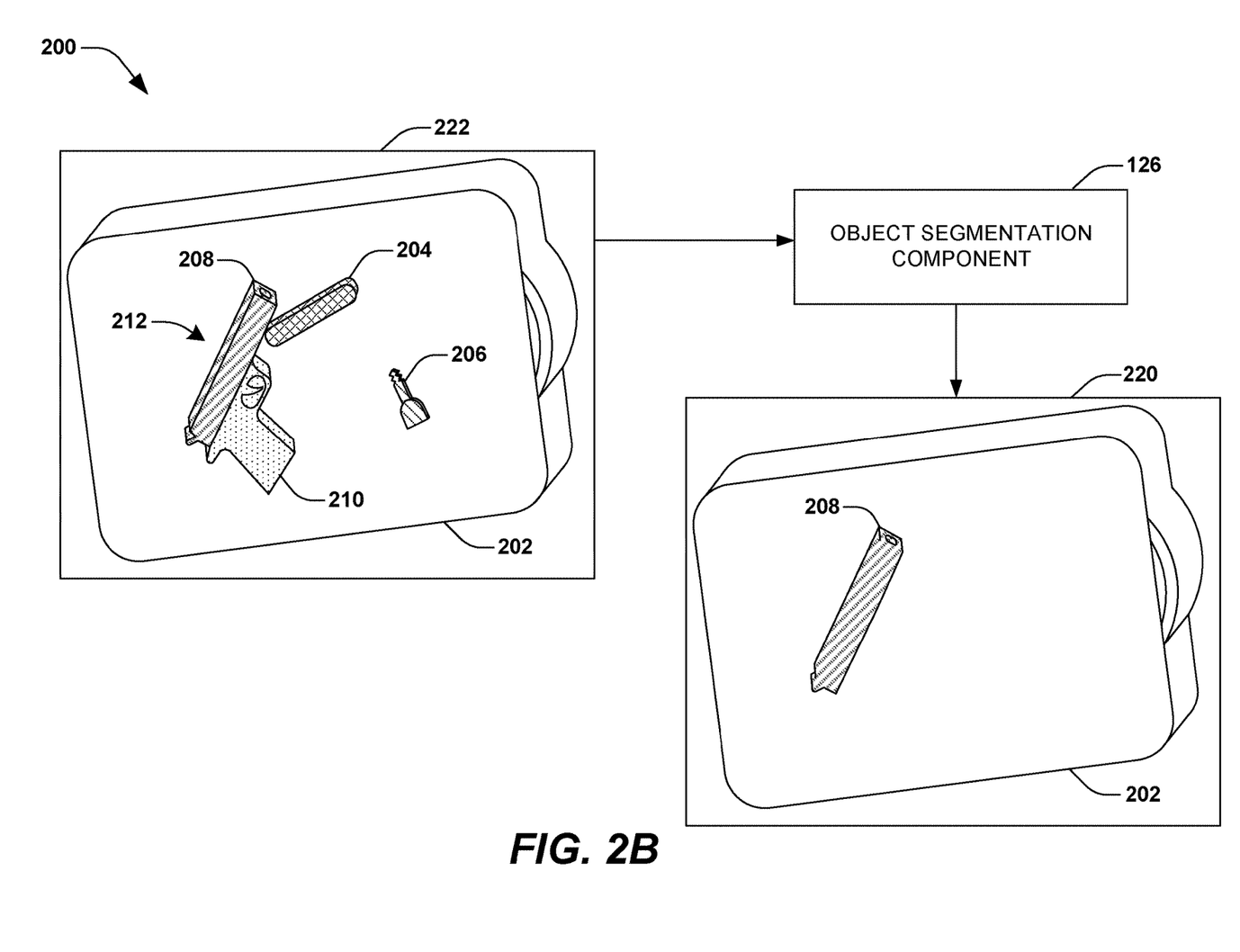
FIG. 2B illustrates an example of visually augmenting a region of a three-dimensional image, where the three-dimensional image is segmented.

FIGS. 2A-2E illustrate a system 200 comprising the item detection component 128. FIG. 2A illustrates a bag object 202 containing one or more items, such as a first item 212 of a gun, a second item 204 of a metal nail file, a third item 206 of a key, and/or other items such as clothing, a plastic toothbrush, etc. The first item 212 of the gun may be composed of multiple parts, such as a metal gun barrel 208 and a plastic handle 210. The examination apparatus 108 may be used to scan the bag object 202. The data acquisition component 122 acquires data from the scan, and the image reconstructor 124 creates a three-dimensional image 222 of the bag object 202, as illustrated in FIG. 2B.

Pre-processing can be performed upon the three-dimensional image 222. In an example, density thresholding (and/or z-effective thresholding if available) is performed upon the three-dimensional image 222. The density thresholding zeros out certain voxels within the three-dimensional image 222, such as voxels having densities (and/or z-effective values) below a threshold density of items of interest (e.g., thresholding out voxels representative of clothing). In another example, a noise reduction technique is performed upon the three-dimensional image 222 to reduce image artifacts within the three-dimensional image 222. For example, smoothing, median filtering to remove hots spots or other image artifacts from reconstruction, and/or other noise reduction techniques can be performed. In another example, a streak reduction technique can be performed to reduce streaks within the three-dimensional image 222. For example, a metal artifact reduction algorithm can be performed to remove streaks from metal objects within the three-dimensional image 222 by re-projecting the three-dimensional image 222 and reconstructing the three-dimensional image 222 (e.g., forward projecting, then filtering, and finally reconstruction of the three-dimensional image 222).

FIG. 2B illustrates the object segmentation component 126 segmenting the three-dimensional image 222 to create segmented three-dimensional images for each item (e.g., items identified by clusters of voxels with similar densities or other similar features). For example, the object segmentation component 126 segments the three-dimensional image 222 to create a segmented three-dimensional image 220 for the gun barrel 208. In an example of segmentation, the three-dimensional image 222 is composed of a plurality of voxels having CT values. The three-dimensional image 222 is colored and/or shaded by assigning a color (or grey-scale value) to each voxel based upon the voxel's CT value. Different colors are used for different density ranges, such as orange for low densities, blue for high densities, and other colors for other density ranges there between. A group of connected (e.g., neighboring or within a threshold distance from one another) voxels having similar density values or colors are determined as representing an item. During segmentation, the group of voxels representing the item are marked as part of the object while other voxels are not marked.

The object segmentation component 126 can utilize various segmentation techniques. In one example, a region growing technique is performed for segmentation by clustering voxels based upon density similarity. Initial clusters of voxels are identified and then grown to include neighboring voxels with densities within threshold similarities to nearby clustered voxels. In another example, a connected components technique is performed for segmentation by scanning across voxels (e.g., scanning across rows of voxels from a top left voxel to a bottom right voxel) of the three-dimensional image 222 to connect (e.g., cluster) voxels with similar densities. In this way, the object segmentation component 126 creates the segmented three-dimensional image 220 for the gun barrel 208 and/or other segmented three-dimensional images for other items (e.g., clusters of voxels).

Figure 2C:
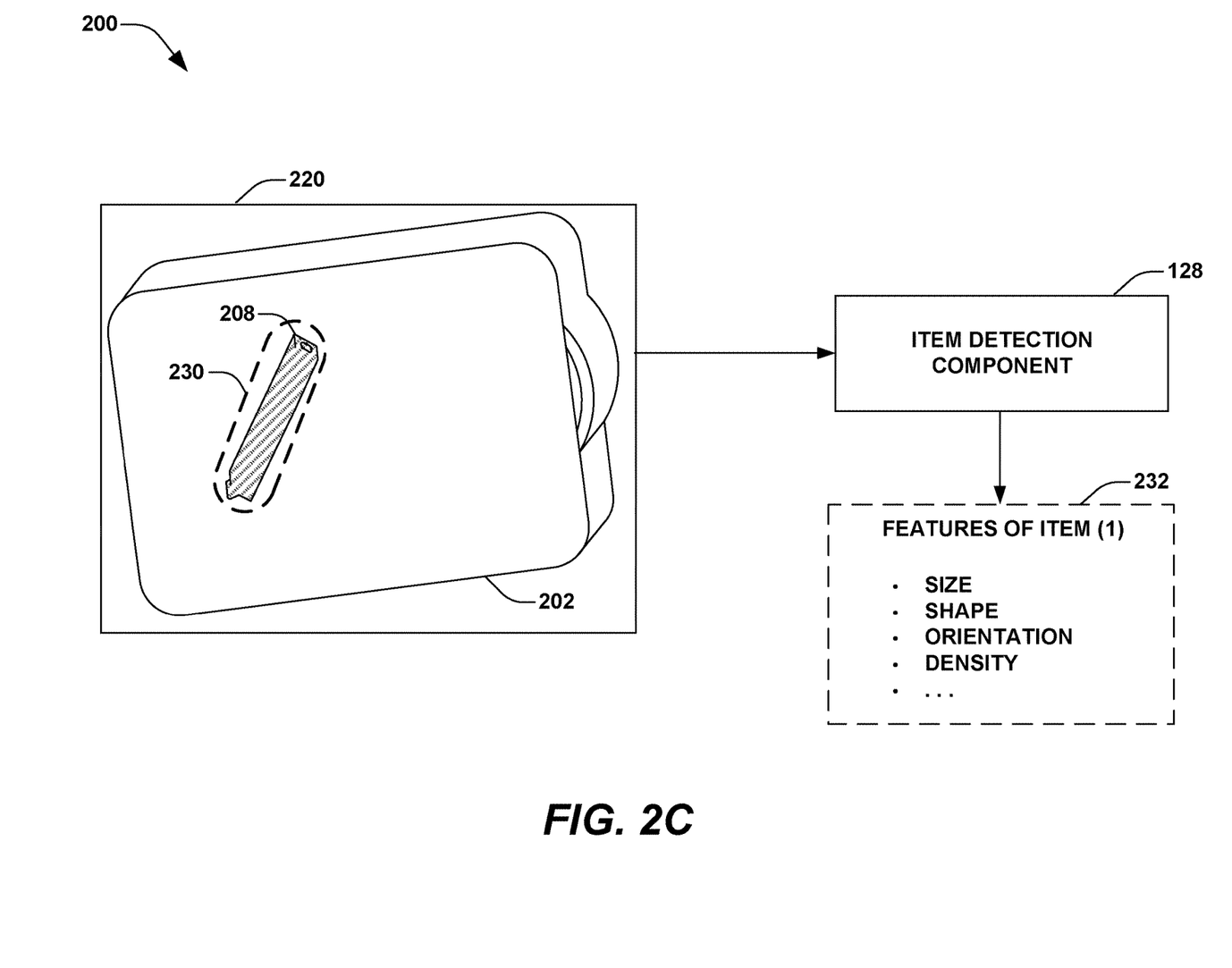
FIG. 2C illustrates an example of visually augmenting a region of a three-dimensional image, where features of an item depicted within the three-dimensional image are identified.

FIG. 2C illustrates the item detection component 128 identifying the gun barrel 208 depicted within a first region 230 of the segmented three-dimensional image 220. In one example, the gun barrel 208 is identified within the first region 230 as being represented by a cluster of voxels having similar densities, such as densities within a density range for metal. The gun barrel 208 may be identified based upon a size and shape of the cluster of voxels being representative of gun barrels. The item detection component 128 extracts features 232 for the gun barrel 208. The features may comprise size, shape (e.g., corners, edges, curvature, etc.), orientation (e.g., a long axis, a short axis, etc.), density, and/or other features derived from voxels within the cluster of voxels representing the gun barrel 208.

In another example, instead of segmenting the three-dimensional image 222, machine learning functionality (e.g., a neural network, deep learning, and/or other feature extraction functionality capable of identifying particular items based upon size, shape, orientation, color, edges, corners, curvature, and/or other features of voxels/pixels within an image) is used to process the three-dimensional image 222 to identify items, extract features of the items, such as size, shape, orientation, density, and/or other features, and use these features to classify objects.

Figure 2D:
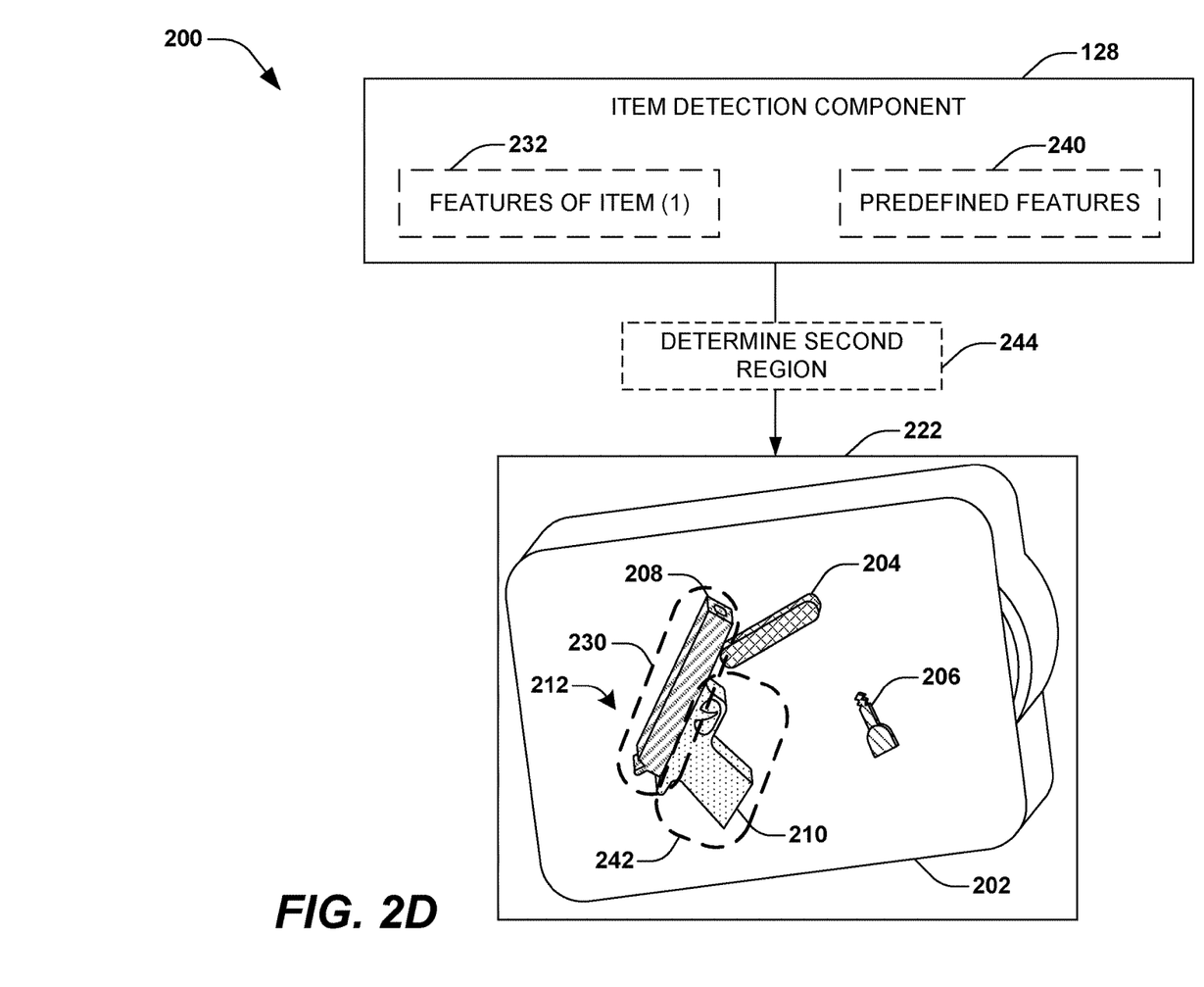
FIG. 2D illustrates an example of visually augmenting a region of a three-dimensional image, where a second region within the three-dimensional image is identified.

FIG. 2D illustrates the item detection component 128 comparing the features 232 of the gun barrel 208 within the first region 230 of the three-dimensional image 222 to predefined features 240 of a target item to be detected. For example, the target item may be gun barrels of certain types of guns. Sizes, shapes, configurations, densities, and/or other features of the gun barrels may be known and thus stored as the predefined features 240. Accordingly, sizes, shapes, configurations, densities, etc. of the features 232 of the gun barrel 208 may be compared with the predefined features 240 to determine if the gun barrel 208 is a target gun barrel to be detected. That is, the set of voxels representing the gun barrel 208 (e.g., initially not known to represent a particular item) are evaluated to identify the features 232, which are compared to the predefined features 240 to determine whether the cluster of voxels represents a targeted item, such as a gun barrel to be detected. For example, the features 232 may be evaluated (e.g., by comparing morphological characteristics of the first item to known characteristics of the target item) to determine a probability that the first item is part of a target item. In this way, the cluster of voxels having the features 232 are determined to represent the gun barrel 208 based upon the features 232 matching the predefined features 240 of gun barrels above a threshold amount.

In response to determining that the features 232 match the predefined features 240 the threshold amount, one or more regions within the three-dimensional image 222 may be identified based upon such regions corresponding to locations where a connected part of the item is predicted to be located. That is, a gun item (e.g., the first item 212) may be known to comprise a gun barrel (e.g., the gun barrel 208) and a handle (e.g., handle 210) that is connected to the gun barrel. Features of the gun item may be known, such as a size, shape, how the gun barrel connects to the handle, etc., of the gun barrel and the handle. Because the handle 210 may be comprised of a material different than the gun barrel 208, the handle 210 is was not initially identifiable such as during segmentation of the gun barrel 208. For example, segmentation based upon density values would not segment the gun barrel 208 and the handle 210 together as the first item 212 because the gun barrel 208 is comprised of a higher density metal and the handle 210 is comprised of a lower density plastic. It may be appreciated that any number of regions, any shape or size of regions (e.g., regions of the same size and shape or different sizes and shapes), and/or any location of regions (e.g., neighboring or within a threshold distance of the first region 230, overlapping or not overlapping the first region 230, etc.) may be determined.

In one example, a second region 242 proximate to the first region 230 (e.g., neighboring or overlapping) is determined 244 (e.g., selected for further examination) based upon the second region 242 having a location corresponding to where the handle 210 is predicted to be located within respect to the gun barrel 208. The second region 242 may be determined based upon a size, shape, and orientation of the gun barrel 208 being indicative of the handle 210 being located in the second region 242 (e.g., the handle 210 is predicted to be at one end of the gun barrel 208). For example, Eigen analysis may be performed on the gun barrel 208 to determine the longest axis (e.g., longest Eigen vector) of the gun barrel 208. Moreover, shape detection may be performed to determine a likely nozzle of the gun barrel 208. Using the Eigen analysis and the location of the likely nozzle, it may be determine that two regions on opposite sides of the longest Eigen vector of the gun barrel 208 and disposed away from the nozzle (e.g., disposed on an opposite side of the gun barrel 208 relative to the nozzle) may be possible candidate-regions for a handle. Thus, a prediction is made as to where the handle 210 would be located with respect to the gun barrel 208 based upon the size, shape, and/or orientation of the gun barrel 208.

A search may then be performed of these two regions to determine if one of these two regions comprises a second item, identified during segmentation, that might be representative of a handle and/or a search of these two regions may be performed to determine if one of these two regions comprises voxels having a CT value within a known range of gun handles (e.g., voxels having a CT value within a known range of plastics). In this way, the second region is evaluated to determine whether a second item of interest (e.g., a handle) is present within the second region. As such, the set of voxels representing the handle 210 may be identified. In still other embodiments, the possible regions where a handle 210 may be located are not narrowed before a search is performed and thus an area surrounding the gun barrel 208 (e.g., on all sides) may be performed to identify voxels having a CT value within a known range of gun handles (e.g., voxels having a CT value within a known range of plastics).

Figure 2E:
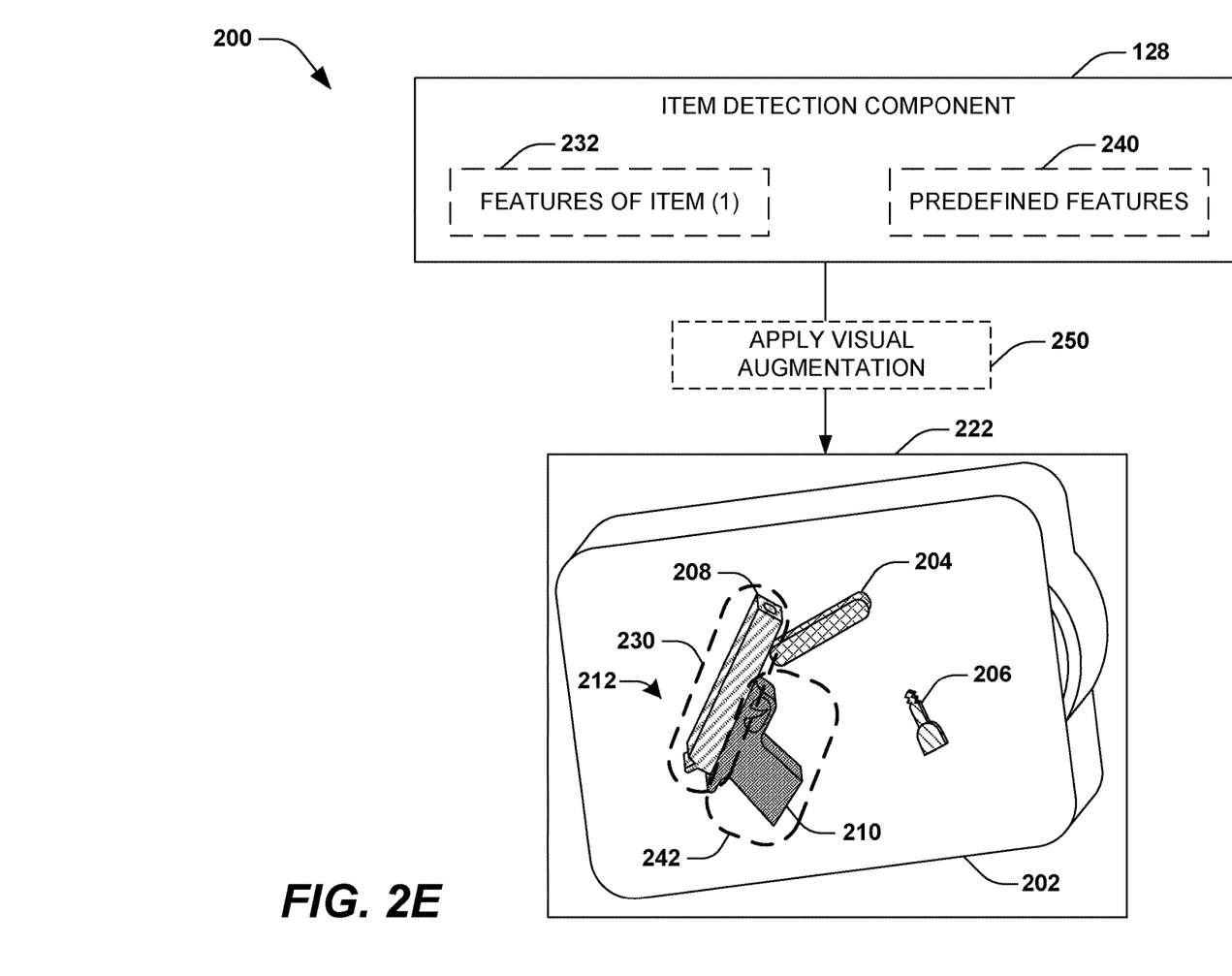
FIG. 2E illustrates an example of visually augmenting a region of a three-dimensional image, where a second region within the three-dimensional image is visually augmented.

FIG. 2E illustrates the item detection component 128 applying 250 a visual augmentation to the second region 242, such as to the handle 210, the entire second region 242 or a portion thereof. The visual augmentation may comprise a color augmentation, a contrast augmentation, an edge enhancement augmentation (e.g., darken, bold, and/or sharpen edges of the second region 242 and/or the handle 210), or any other augmentation that may visually distinguish the second region 242 from other regions of the three-dimensional image 222. In one example, the visual augmentation is merely applied to the second region 242 even though other portions of the three-dimensional image 222 may comprise voxels having densities similar to the handle 210 because such voxels may represent other types of plastic items such as a tooth brush. In this way, the augmented image is rendered through a display so that an operator may easily identify the second region 242 for further manual analysis such as threat detection. If more than one region was identified, then each region may be visually augmented with the same or different types of visual augmentations (e.g., colored with the same or different colors).

The identification of items of interest may be tuned based upon various factors. That is, items are identified as items of interest based upon such items having features matching the predefined features 240 within a threshold amount. A value of the threshold amount may be adjusted. The value may be adjusted based upon a current threat level (e.g., the threshold value may be lowered, so that more items are identified as potentially being an item of interest, for higher threat levels). The value of the threshold may be adjusted based upon information regarding an owner of the object. For example, the value may be lowered if the owner bought a flight ticket with cash 1 hour before the flight, and thus may pose a relatively greater potential threat. Decreasing the value of the threshold amount may result in more items being identified as target items. The value may be increased if the owner is a government agent whose agency purchased the flight ticket because the government agent may pose a relatively lesser potential threat. Increasing the value of the threshold amount may result in less items being identified as target items.

It may be appreciated that visually augmenting regions of images may be performed for any type of image within various contexts beyond merely CT images, three-dimensional images, and/or threat detection (e.g., augmentation of various types of images that may related to a healthcare sector, a government sector, a map creation company, a military sector, personal photography, etc.).

Moreover, in addition to or instead of applying 250 a visual augmentation to the second region 242, the item detection component 128 may alter a grouping of voxels based upon a determination that the second item is present within the second region. For example, the item detection component 128 may group voxels of the first item with voxels of the second item, such that the first item and the second item are treated as a single item, upon determining that the second item is present within the second region. It may be appreciated that object detection (e.g., object analysis during which the characteristics of the item is compared to known characteristics of items of interest (e.g., threat items)) may be performed on the grouped voxels of the first item and the second item to determine whether the single item is a potential threat item.

Figure 3:
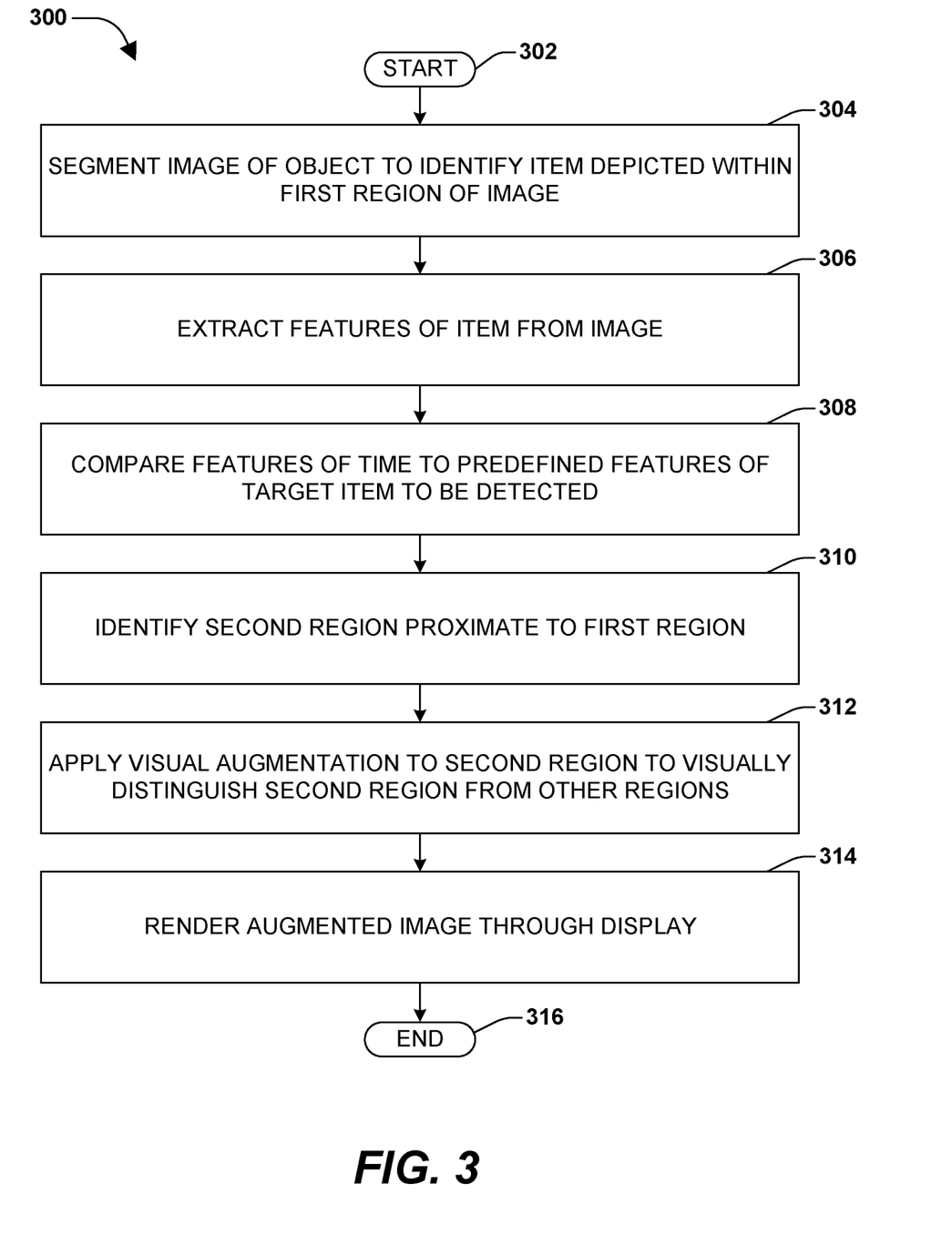
FIG. 3 illustrates a flow diagram of an example method for visually augmenting a region of an image.

FIG. 3 illustrates an example method 300 for visually augmenting regions within an image. More particularly, the example method 300 describes a technique for identifying an item having a first density (e.g., a relatively denser metal knife blade) and a connected part of the item having a second density different than the first density (e.g., a relatively lesser dense wooden knife handle). In this way, a region encompassing the connected part may be visually distinguished, such as colored, highlighted, edge enhanced, etc.

The example method 300 begins at 302, and an image of an object (e.g., a briefcase) is segmented to identify an item (e.g., the metal knife blade) depicted within a first region of the image, at 304. The item may be identified based upon voxels having similar density values (e.g., expected density values of metal) and/or being within a proximity to one another.

At 306, features of the item are extracted from the image. The features may relate to edges, corners, curvature, density, size, shape, orientation, depth, and/or properties of voxels representing the item.

At 308, the features of the item (e.g., of the voxels representing the item) are compared to predefined features of target items to be detected. The predefined features may corresponding to edges, corners, curvature, density, size, shape, orientation, depth, and/or properties of metal knife blades, guns, explosives, etc. In this way, the features of the item may be identified as matching the predefined features of a target item (e.g., the metal knife blade) within a threshold amount.

At 310, one or more additional regions may be identified based upon such regions being in locations corresponding to where a connected part of the item (e.g., a wooden or plastic knife handle) are predicted to be located. For example, a second region may be identified at one end of a long axis of the metal knife blade where the metal knife blade may attach to the knife handle. A third region may be identified at the other end of the long axis of the metal knife blade where the metal knife blade may attach to the knife handle. Locations of such regions may be predicted as locations at which the connected part may be located based upon a size, shape, orientation, and/or other features of the metal knife blade.

At 312, one or more visual augmentations may be applied to the one or more additional regions to distinguish the one or more additional regions from other regions within the image. For example, a red color may be applied to the second region and the third region. In another example, the red color may be applied to the second region and a green color may be applied to the third region. In another example, an edge enhancement may be applied to the second region and the third region may be highlighted. It may be appreciated that any combination or variation of visual augmentations may be applied to the one or more additional regions and/or the first region (e.g., a same augmentation, a different augmentation, or no augmentation may be applied to the first region). Accordingly, an augmented image comprising the augmented regions is created.

At 314, the augmented image is rendered on a display. In this way, an operator may be able to more easily visually identify the connected part (e.g., the plastic knife handle) that may otherwise be difficult or impossible to identify such as due to the relatively low density of plastic of the plastic knife handle.

The example method 300 ends at 320.

Figure 4:
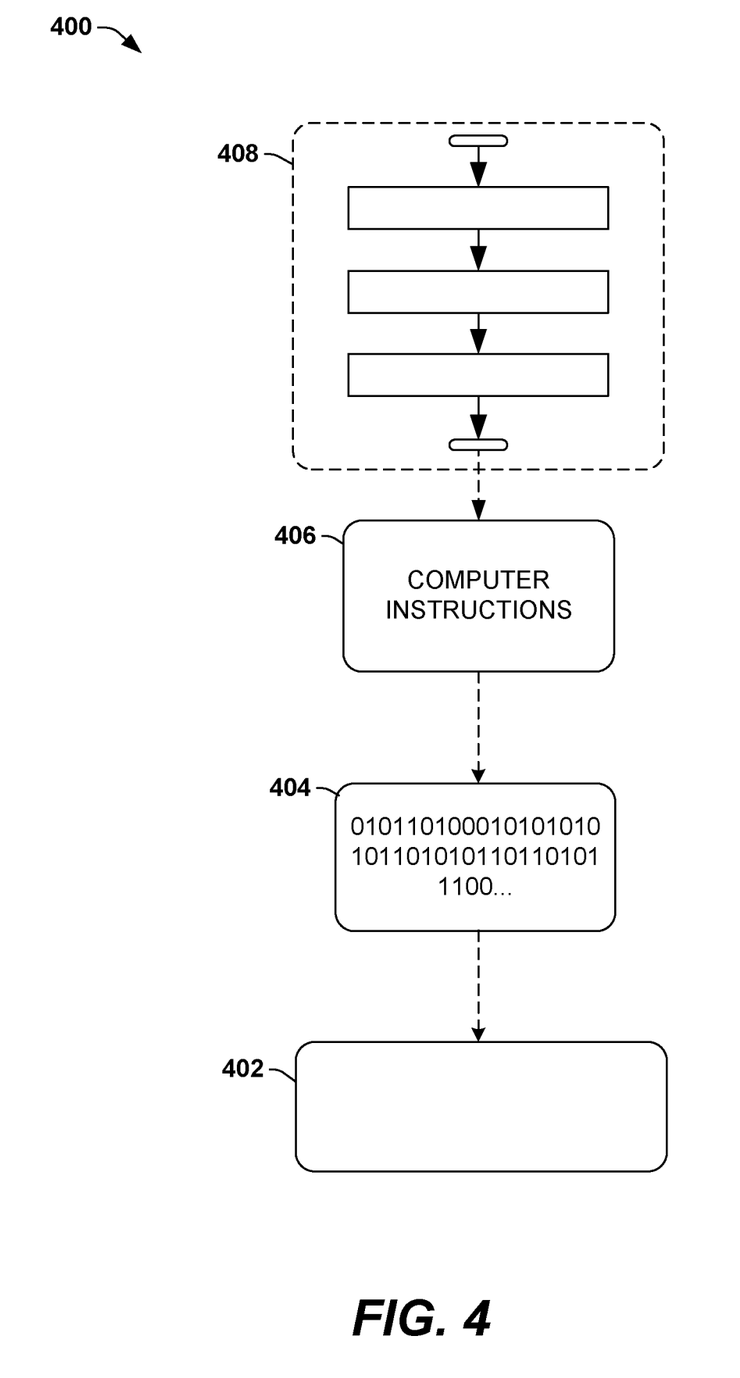
FIG. 4 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 4, wherein the implementation 400 comprises a computer-readable medium 402 (e.g., a CD-R, DVD-R, or a platter of a hard disk drive), on which is encoded computer-readable data 404. This computer-readable data 404 in turn comprises a set of processor-executable instructions 406 configured to operate according to one or more of the principles set forth herein. In one such embodiment of implementation 400, the processor-executable instructions 406 may be configured to perform a method 408, such as at least some of the example method 300 of FIG. 3. In another such embodiment, the processor-executable instructions 406 may be configured to implement a system, such as at least some of the example environment 100 of FIG. 1 and/or at least some of the system 200 of FIGS. 2A-2E, for example. Many such computer-readable media may be devised by those of ordinary skill in the art that are configured to operate in accordance with one or more of the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system," "interface," and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
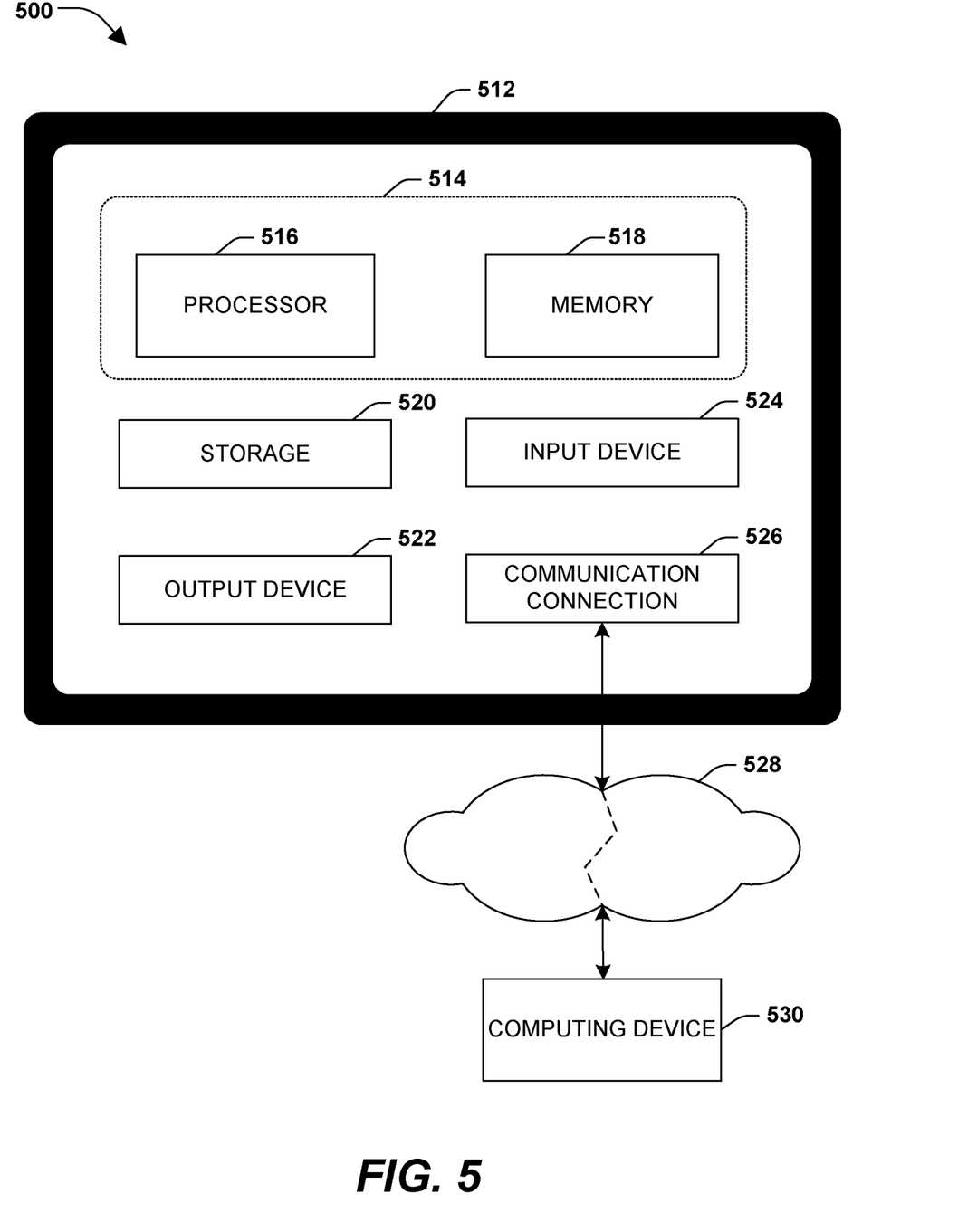
FIG. 5 illustrates an example computing environment wherein one or more of the provisions set forth herein may be implemented.

FIG. 5 and the following discussion provide a brief, general description of a suitable computing environment to implement embodiments of one or more of the provisions set forth herein. The operating environment of FIG. 5 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer-readable instructions" being executed by one or more computing devices. Computer-readable instructions may be distributed via computer-readable media (discussed below). Computer-readable instructions may be implemented as program modules, such as functions, objects, Application Programming Interfaces (APIs), data structures, and the like, that perform particular tasks or implement particular abstract data types. Typically, the functionality of the computer-readable instructions may be combined or distributed as desired in various environments.

FIG. 5 illustrates an example of a system 500 comprising a computing device 512 configured to implement one or more embodiments provided herein. In one configuration, computing device 512 includes at least one processor 516 and memory 518. Depending on the exact configuration and type of computing device, memory 518 may be volatile (such as RAM, for example), non-volatile (such as ROM, flash memory, etc., for example) or some combination of the two. This configuration is illustrated in FIG. 5 by dashed line 514.

In other embodiments, device 512 may include additional features and/or functionality. For example, device 512 may also include additional storage (e.g., removable and/or non-removable) including, but not limited to, magnetic storage, optical storage, and the like. Such additional storage is illustrated in FIG. 5 by storage 520. In one embodiment, computer-readable instructions to implement one or more embodiments provided herein may be in storage 520. Storage 520 may also store other computer-readable instructions to implement an operating system, an application program, and the like. Computer-readable instructions may be loaded in memory 518 for execution by processor 516, for example.

The term "computer-readable media" as used herein includes computer storage media. Computer storage media includes volatile and nonvolatile, removable and non-removable media implemented in any method or technology for storage of information such as computer-readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 512. Computer storage media does not, however, include propagated signals. Rather, computer storage media excludes propagated signals. Any such computer storage media may be part of device 512.

Device 512 may also include communication connection 526 that allows device 512 to communicate with other devices. Communication connection 526 may include, but is not limited to, a modem, a Network Interface Card (NIC), an integrated network interface, a radio frequency transmitter/receiver, an infrared port, a USB connection, or other interfaces for connecting computing device 512 to other computing devices. Communication connection 526 may include a wired connection or a wireless connection. Communication connection 526 may transmit and/or receive communication media.

The term "computer-readable media" may include communication media. Communication media typically embodies computer-readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 512 may include input device 524 such as keyboard, mouse, pen, voice input device, touch input device, infrared cameras, video input devices, and/or any other input device. Output device 522 such as one or more displays, speakers, printers, and/or any other output device may also be included in device 512. Input device 524 and output device 522 may be connected to device 512 via a wired connection, wireless connection, or any combination thereof. In one embodiment, an input device or an output device from another computing device may be used as input device 524 or output device 522 for computing device 512.

Components of computing device 512 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 512 may be interconnected by a network. For example, memory 518 may be comprised of multiple physical memory units located in different physical locations interconnected by a network.

Those skilled in the art will realize that storage devices utilized to store computer-readable instructions may be distributed across a network. For example, a computing device 530 accessible via a network 528 may store computer-readable instructions to implement one or more embodiments provided herein. Computing device 512 may access computing device 530 and download a part or all of the computer-readable instructions for execution. Alternatively, computing device 512 may download pieces of the computer-readable instructions, as needed, or some instructions may be executed at computing device 512 and some at computing device 530.

Various operations of embodiments are provided herein. In one embodiment, one or more of the operations described may constitute computer-readable instructions stored on one or more computer-readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc., for features, elements, items, etc. For example, a first object and a second object generally correspond to object A and object B or two different or two identical objects or the same object.

It may be appreciated that "example" and/or "exemplary" are used herein to mean serving as an example, instance, or illustration. Any aspect, design, etc., described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same of different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A method, comprising:
   extracting features of an item within a first region of a segmented image of an object;
   comparing the features of the item to predefined features of a target item to be detected;
   responsive to determining that the features of the item match the predefined features within a threshold amount, identifying a second region proximate to the first region comprising the item based upon a location of the second region corresponding to where a connected part of the item is predicted to be located;
   applying a visual augmentation to the second region to visually distinguish the second region from other regions depicted within the segmented image to create an augmented image; and
   rendering the augmented image through a display.

2. The method of claim 1, comprising:
   performing segmentation and feature extraction upon the second region to identify the connected part; and
   applying the visual augmentation to the connected part depicted within the second region.

3. The method of claim 1, wherein the identifying a second region comprises:
   identifying a size, a shape, and an orientation of the item; and
   predicting where the connected part would be located with respect to the item based upon the size, the shape, and the orientation of the item.

4. The method of claim 1, wherein the identifying a second region comprises:
   identifying an axis of the item; and
   defining the second region as being located at an end of the axis orthogonal to the item.

5. The method of claim 1, wherein the identifying a second region comprises:
   evaluating density of voxels within the second region to identify a set of voxels with densities within a threshold similarity; and
   identifying the connected part as being represented by the set of voxels.

6. The method of claim 1, wherein the item comprises a material with a larger density than the connected part.

7. The method of claim 1, comprising:
   performing density thresholding upon the segmented image to zero out voxels having densities below a threshold.

8. The method of claim 1, wherein the target item has an associated threat level.

9. An apparatus, comprising:
   a processor; and
   a memory storing instructions that, when executed by the processor, configure the apparatus to:
      identify an item within a first region of a three-dimensional image as a potential item of interest by comparing features of items depicted within the three-dimensional image to predefined features of an item of interest to be detected;
      responsive to determining that features of the item match the predefined features within a threshold amount, identify a second region proximate to the first region comprising the item based upon a location of the second region corresponding to where a connected part of the item is predicted to be located;
      apply a visual augmentation to the second region to visually distinguish the second region from other regions depicted within the image to create an augmented image; and
      render the augmented image through a display.

10. The apparatus of claim 9, wherein the item detection component is configured to:
    apply a color augmentation to the second region.

11. The apparatus of claim 9, wherein the item detection component is configured to:
    apply a contrast augmentation to the second region.

12. The apparatus of claim 9, wherein the item detection component is configured to:

apply an edge enhancement augmentation to the second region.

13. The apparatus of claim 9, wherein the item detection component is configured to:
   determine a predicted location of the connected part within the second region; and
   apply the visual augmentation to the connected part at the predicted location.

14. The apparatus of claim 9, wherein the item detection component is configured to:
   determine a context associated with an object; and
   adjust a value of the threshold amount based upon the context.

15. The apparatus of claim 14, wherein the context corresponds to a current threat level.

16. The apparatus of claim 14, wherein the context corresponds to information regarding an owner of the object.

* * * * *